HYDRAULIC CEMENT AND METHOD OF PRODUCING SAME
Filed Oct. 30, 1970
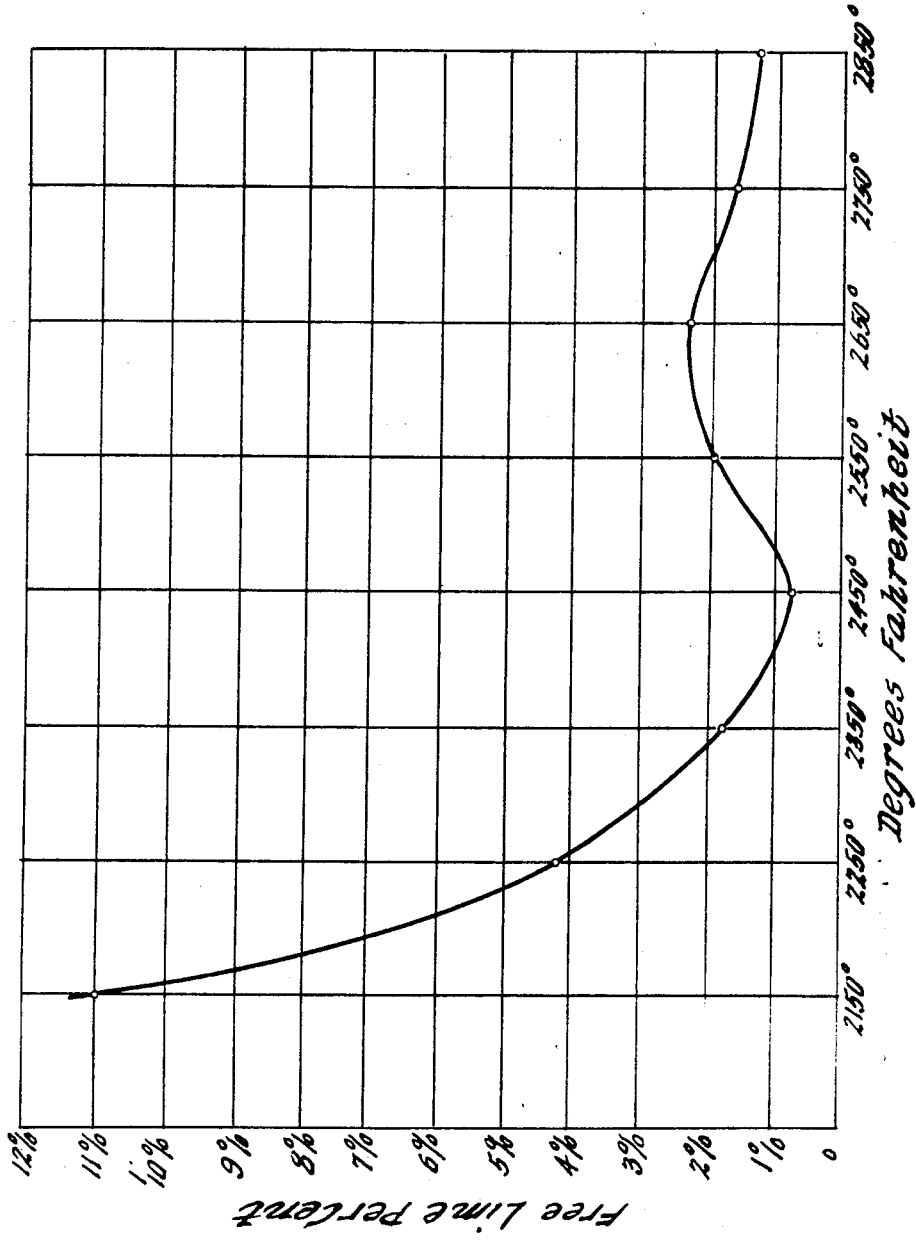

United States Patent Office 3,682,669
Patented Aug. 8, 1972

3,682,669
HYDRAULIC CEMENT AND METHOD OF
PRODUCING SAME
Thomas C. Slater, Sutter Creek, Calif., and Floyd C. Hamilton, Jr., Louisville, Ky., assignors to The Flintkote Company, White Plains, N.Y.
Continuation-in-part of application Ser. No. 70,596, Sept. 8, 1970, which is a continuation of application Ser. No. 652,275, July 10, 1967. This application Oct. 30, 1970, Ser. No. 85,776
Int. Cl. C04b 7/38
U.S. Cl. 106—100
11 Claims

ABSTRACT OF THE DISCLOSURE

Ground mixtures of conventional portland cement-making components are mixed with relatively small amounts of boron-containing components, and the mixtures are burned at kiln temperatures substantially below those normally utilized to form clinker. The resultant clinker is more easily grindable than that produced in conventional processes of portland cement production, and the cement resulting from the grinding of the clinker yields cementitious product possessing substantially higher compressive strength than is exhibited by portland cement made from the same components in the absence of the boron-containing component.

---

This application is a continuation-in-part of our co-pending application Ser. No. 70,596 filed on or about Sept. 8, 1970 under Commissioner's Order 824 O.G. 1, which application is a continuation of application Ser. No. 652,275 filed July 10, 1967 both now abandoned.

The filed of art to which the present invention pertains is the making of portland-type cement.

The invention relates particularly to the production of portland cement and provides a method that, inter alia, results in a substantial savings in fuel and other operating costs and yields portland cement that forms products of substantially higher than normal compressive strengths.

In the conventional commercial practice for producing portland cement, certain proportions of crushed calcium carbonate, aluminum oxide, silicon dioxide and ferric oxide are pulverized, either in dry or slurry form. The ground mixture is burned in a kiln, usually of the rotary type, to form solid "clinker" that is pulverized with a small amount of gypsum to form the cement.

It is well recognized in the art that the operation of the kiln for forming clinker accounts for one of the largest single elements in the cost of producing portland cement.

The ground mixture must be burned at a temperature sufficiently high both to promote reaction in the solid state and to bring about fusion of the components, and thus to form clinker. The clinker is composed of calcium silicates, calcium aluminates, and calcium aluminate-ferrites, which constitute the hydraulically settable ingredients of cement formed by grinding the clinker.

Theoretically, the incipent fusion leading to the formation of the above-mentioned compounds can occur at a temperature of about 1338° C. (2440° F.). The formation of clinker is influenced by the amount of liquid formed in the fusion, which is governed by the amount of aluminum oxide and iron oxide in the ground mixture.

In actual commercial operation utilizing rotary kilns at practical production rates, the residence or retention time of the material in the kiln at the above-mentioned minimum theoretical temperature is not long enough for the complete reaction to take place. Thus higher temperatures must be used to accelerate and complete the reaction between the components of the mix.

As indicated, for example, in the patents to Case, No. 2,004,463 of June 11, 1935, to Dyckerhoff, No. 2,970,-925 of Feb. 7, 1961, and to Schifferle, No. 3,066,031 of Nov. 27, 1962, kiln temperatures of 1400° C. to 1450° C. (2550° F. to 2650° F.) are commonly utilized in commerical operations for forming cement clinker, although currently higher temperatures are usually used.

It is also well recognized in the prior art that the clinker produced by present commercial operations is difficult to grind into a powder suitable for use as cement.

Stated in general terms, the present invention makes possible the production of portland cement clinker at temperatures substantially lower than those presently employed in commercial practice, and clinker that is more readily grindable than clinker produced in present commercial operations. Furthermore, the resultant ground cement forms concrete and other cementitious compositions that possess compressive strengths superior to those exhibited by portland cement as presently commercially produced.

The foregoing objects and advantages of the invention are achieved by incorporating into the ground mix of ingredients conventionally employed for the production of portland cement, namely, limestone, silica, alumina and iron oxide, a relatively small portion of an additive material consisting essentially of a boron-containing component, and burning the mixture thus formed in a conventional portland cement kiln.

It has been found that the inclusion of such an additive as a component of the mix makes possible the formation of cement clinker at temperatures of about 2350° F. to about 2550° F. at about the same kiln retention time as in conventional processes. Clinker produced in this manner has improved grindability characteristics as indicated, for example, by less energy being needed to grind the clinker to a given surface area. The compressive strength of portland cement produced as described herein is substantially higher than the compressive strength of cement made from the same components but without the boron-containing component.

The curve of the accompanying drawing shows the relationship between the kiln burning temperature and the amount of free lime in clinker made in accordance with this invention.

To produce portland cement according to this invention, there is first formed by conventional procedures a pulverized mixture of raw materials composed of minerals containing calcium oxide, silicon dioxide, aluminum oxide and iron oxide. Limestone can be utilized as the source of calcium oxide. Silicon dioxide can be supplied in the form of sand, clay or shale, which can also be the source of aluminm oxide. The source of iron oxide can be mill scale, a by-product of steel mills, pyrite cinders, a by-product of sulfuric acid production, or iron ore. Iron oxide also is usually present in the raw materials used as the source of silicon dioxide and aluminum oxide. The raw materials are carefully proportioned and blended to maintain the relative proportions of the oxides within certain desired limits, in accordance with well-known practice, to produce cement having desired properties and characteristics. Typically, a portland cement has about 60% to 70% of lime as CaO, about 20% to 25% of silicate as $SiO_2$, about 2% to 6% of iron oxide as $Fe_2O_3$, and about 3% to 8% of alumina as $Al_2A_3$.

The pulverized mixture of the raw materials noramlly requires a burning temperature of the order of 2750° F. in the kiln to be transformed into a cement clinker composed of desired percentage amounts of calcium silicate, calcium aluminate and calcium aluminate-ferrite reaction products. In accordance with the present invention, however, a cement clinker composed of the above-mentioned reaction products is formed at substantially lower burning temperatures in the kiln, namely, at temperatures of about 2350° F. to about 2550° F. This is achieved by incorporating a relatively small amount of a boron-containing material into the pulverized mixture of the raw materials fed to the kiln.

The boron-containing additive is intimately blended and intermixed with the raw pulverized mixture, or can be interground in the initial grinding process, and the material thus blended is fed to the kiln for burning into clinker.

The presence of the boron-containing component in the raw material fed into the kiln enables the raw material to be transformed into a highly satisfactory clinker at temperatures substantially lower than those normally required for mixtures without the boron-containing additive. Moreover, the resultant clinker possesses improved grindability and yields a pulverized cement that forms concrete and other cementitious compositions having superior compressive strengths.

During burning of the mixture, the rate and degree of completion of formation of the calcium silicate and calcium aluminate reaction products, particularly tricalcium silicate, is indicated by the amount of uncombined calcium oxide (CaO), so-salled "free lime," present in the clinker. If the amount of free lime in the clinker exceeds about 2% by weight the resultant cement might be unsatisfactory, particularly in that such cement is susceptible to excessive expansion.

By including the boron-containing additive in the raw materials fed to the kiln, the clinker not only is formed at temperatures that are substantially below those conventionally required, but does not contain undesired amounts of free lime. Clinker having a satisfactory free lime content of about 2% or less can be obtained at kiln temperatures in the range of about 2350° F. to about 2550° F. At kiln temperature below that range, undesired amounts of free lime tend to be present in the clinker; at kiln temperatures above that range, the clinker might contain an undesired amount of free lime.

The boron-containing additive used in the practice of this invention is an oxide of boron, a compound containing an oxide of boron or a compound that yields an oxide of boron at the temperature prevailing in a cement kiln. Examples of such boron-containing additives are boric acid anhydride, acids of boric acid anhydride, salts of boric acid anhydride, polyboric acids and polyborates such as diborates, triborates and tetraborates of ammonium, sodium, potassium, calcium, barium, strontium and magnesium, and boron-containing refined and unrefined minerals or ores, including colemanite, and ulexite, danburite, pinnoite, ascherite and rasorite. The quantity of the boron-containing additive incorporated in the pulverized mixture of raw ingredients fed to the kiln is relatively small. An amount sufficient to provide a $B_2O_3$ content in the range of about 1% to about 3% by weight of the pulverized mixture, preferably about 1.5% to about 2.5%, should be used, which amounts approximately can then be found in the clinker.

In an actual embodiment of the invention, a modified typical Type II portland cement pulverized mix was made up with the following components:

| | Percent |
|---|---|
| Cataract limestone | 72.58 |
| Cataract shale | 16.60 |
| Winship clay | 3.67 |
| Pyrite cinders | 2.39 |
| Special additive #1 | 4.76 |
| "A. Modifier" | 100.00 |

Special Additive #1 contained:

| | Percent |
|---|---|
| $SiO_2$ | 8.00 |
| $Fe_2O_3$ | 0.19 |
| $Al_2O_3$ | 0.35 |
| CaO | 14.66 |
| MgO | 2.67 |
| $Na_2O$ | 5.19 |
| $K_2O$ | 0.23 |
| $B_2O_3$ | 36.13 |
| Ign. Loss | 32.57 |
| Total | 99.99 |

Thus, the mix had the following calculated composition:

| | Percent |
|---|---|
| $SiO_2$ | 22.55 |
| $Al_2O_3$ | 5.82 |
| $Fe_2O_3$ | 4.45 |
| CaO | 64.85 |
| $B_2O_3$ | 1.86 |
| | 99.53 |

Batches of the foregoing A. Modified mix were burned at various temperatures for a period of time equal to a typical portland cement kiln retention time at normal operation temperature of about 2800° F. The clinker prepared from each such batch contained the following amount of free lime:

| Burn temperature, ° F. | Percent free lime |
|---|---|
| 2150 | 11.11 |
| 2250 | 4.24 |
| 2350 | 1.76 |
| 2450 | 0.77 |
| 2550 | 1.98 |
| 2650 | 2.26 |
| 2750 | 1.60 |
| 2850 | 1.27 |

The curve of the accompanying drawing is based on the above-tabulated data, and clearly shows that clinker having a desirably low level of free lime can be prepared at burn temperatures in the range of about 2350° F. to about 2550° F., a range of temperature markedly lower than the temperatures usually employed to make portland cement clinker having satisfactory low free lime content.

The production of a satisfactory cement clinker thus is possible at reduced kiln temperatures, and substantial savings in fuel cost as well as the other benefits can be obtained. Fuel savings that amount to the order of about 300,000 B.t.u. per barrel of cement clinker produced have been calculated. Also, by virtue of the lower temperatures utilized in the kiln operation longer kiln shell life and less frequent replacement of the refractory lining of the kiln are benefits that result in substantially reduced kiln maintenance cost. This cost reduction has been estimated to be of the order of about 10%.

In addition to and perhaps even more important than the foregoing advantages accruing from the use of the described boron-containing additives in accordance with this invention is the improvement thereby obtained with respect to the compressive strength of the resultant cement. Indicative of the superior strength characteristics of portland cement made from clinker produced in accordance with the invention are the data set forth herebelow.

As a control, a typical Type II portland cement mix without modification by an additive component of this invention was burned at about 2800° F. for about 30 minutes. The mix had the following raw materials and calculated compositions:

|  | Percent |
|---|---|
| Cataract limestone | 76.21 |
| Cataract shale | 17.43 |
| Winship clay | 3.85 |
| Pyrite cinders | 2.51 |
| "A. Control" | 100.00 |

|  | Percent |
|---|---|
| $SiO_2$ | 22.50 |
| $Al_2O_3$ | 5.89 |
| $Fe_2O_3$ | 4.52 |
| CaO | 65.17 |
|  | 98.08 |

The free lime content of the clinker was 0.72%.

Compressive strength tests (ASTM Test C 109-64) were conducted on mortar cubes 2" x 2" x 2" made of the typical Type II Control cement described above and the A. Modified cement according to this invention from clinker burned at 2450° F. The cubes were kept in a cabinet in which the atmosphere was controlled at 70° F. and 100% relative humidity. The compressive strength of the cubes was tested after 7 and 28 days. The following table presents the results obtained and various factors involved in making the tests for the cements described above and also for another cement according to this invention ("B. Modified") to be described:

|  | A. modified | A. control | B. modified |
|---|---|---|---|
| Clinkered temp. (° F.) | 2,450 | 2,800 | 2,550 |
| $B_2O_3$ (percent) | 1.88 |  | 1.54 |
| Free lime (percent) | 0.77 | 0.72 | 2.17 |
| Blaine fineness | 3,591 | 4,195 | 3,585 |
| $SO_3$ added (percent) * | 1.52 | 1.94 | 0.59 |
| Water (cc.) | 230 | 250 | 230 |
| Initial set (hr.:min.) | 4:20 | 1:10 | 2:30 |
| Final set (hr.:min.) | 7:00 | 3:40 | 7+ |
| Compressive strength: |  |  |  |
| 7 days (p.s.i.) | 4,558 | 3,133 | 4,308 |
| 28 days (p.s.i.) | 9,375 | 5,267 | 9,258 |

* As gypsum to make cement.

The B. Modified cement was prepared from a raw material mix containing 95.24 parts by weight of the A. Control cement raw material mix and 4.76 of Special Additive #1, and had a calculated composition as follows:

|  | Percent |
|---|---|
| $SiO_2$ | 21.40 |
| $Fe_2O_3$ | 4.30 |
| $Al_2O_3$ | 5.60 |
| CaO | 63.57 |
| $B_2O_3$ | 1.54 |
| $Na_2O$ | 0.26 |
| Insol. | 0.82 |
| $H_2O$ | 0.82 |
| Total | 98.31 |

Clinker was formed by burning the raw mix at 2550° F. for about 30 minutes, and had a free lime content of about 2.17%.

Compressive strength tests of steam-cured mortar cubes were made using a cement modified according to this invention ("C. Modified") and an unmodified typical Type II pipe cement as a control ("B. Control").

The C. Modified cement was made from clinker formed at a burning temperature of about 2650° F. for about 30 minutes from a raw mix of 6.79 parts of Special Additive #2 (unrefined Kern County colemanite containing 34.11% $B_2O_3$) and 93.21 parts of the Type II control mix set forth above. The clinker from this raw mix had a calculated analysis of:

|  | Percent |
|---|---|
| $SiO_2$ | 22.63 |
| $Al_2O_3$ | 5.71 |
| $Fe_2O_3$ | 4.37 |
| CaO | 64.79 |
| $B_2O_3$ | 1.87 |
| "C. Modified" | 99.37 |

The clinker had a free lime content of about 1.93%.

As a control cement, a commercial Type II portland pipe cement burned at about 2800° F. and having about 1.48% free lime was used. The control cement had an analyzed composition as follows:

|  | Percent |
|---|---|
| $SiO_2$ | 21.96 |
| $Fe_2O_3$ | 3.28 |
| $Al_2O_3$ | 4.80 |
| CaO | 64.87 |
| $SO_3$* | 2.38 |
| "B. Control" | 97.29 |

*Added as about 5% gypsum.

Cubes were made from mortar containing 1982 grams of sand and 793 grams of the B. Control cement and the C. Modified cement, and were cured for 20 hours in a cabinet mantained at 165° F. with steam. Thereafter, the cubes were placed in a cabinet at 70° F. and 100% relative humidity, and compressive strength tests were made on the cubes after 14 hours, 7 day and 28 days. The following tabulation sets forth the strength and other factors associated with this test.

|  | C. Modified | B. Control |
|---|---|---|
| Flow consistency (percent $H_2O$) | 38 | 41 |
| Water added (cc.) | 300 | 325 |
| Flow reading | 73.5 | 71.5 |
| Blaine finess | 3,662 | 4,014 |
| Initial set (hr.:min.) |  | 2:30 |
| Final set (hr.:min.) | 7:00 | 4:25 |
| Compressive strength: |  |  |
| 14 hrs. (p.s.i.) | 5,350 | 5,525 |
| 7 days (p.s.i.) | 7,438 | 6,162 |
| 28 days (p.s.i.) | 9,300 | 7,412 |

Compressive strength tests were also conducted on concrete cylinders (ASTM Test C 192-65) made from a Type II portland cement modified according to this invention ("D. Modified) and an unmodified Type II cement ("C. Control"). The clinker used to make the D. Modified cement had an analysis of:

|  | Percent |
|---|---|
| $SiO_2$ | 24.46 |
| $Fe_2O_3$ | 3.96 |
| $Al_2O_3$ | 4.72 |
| CaO | 63.15 |
| $B_2O_3$ | 1.97 |
| "D. Modified" | 98.26 | and contained 1.60% free lime after burning at about 2500° F. in a kiln for a usual kiln retention time of about 30 minutes. The raw material mix contained about 2.0% of $B_2O_3$ supplied as boron trioxide. The C. Control cement, which contained 1.12% free lime, analyzed as:

|  | Percent |
|---|---|
| $SiO_2$ | 22.02 |
| $Fe_2O_3$ | 3.60 |
| $Al_2O_3$ | 4.74 |
| CaO | 64.67 |
| $SO_3$* | 2.09 |
| "C. Control" | 97.12 |

*Added as about 5% gypsum.

Six sacks (94 lbs.) of each cement was mixed per cubic yard with ¾ inch Neilsen (Calaveras County, Cal.) coarse aggregate and sufficient water to provide a 4 inch slump. Cylinders 6 inches in diameter and 12 inches long were cast with the concrete and kept at 70° F. and 100% relative humidity. The cylinders had the following strengths:

|  | C. Control | D. Modified |
|---|---|---|
| 7 days (p.s.i.) | 2,420 | 3,080 |
| 14 days (p.s.i.) | 3,400 | 4,375 |

From the foregoing data based on compressive strength tests, it is evident that cements made with the boron-containing additives according to this invention have significantly greater strength, even though made at remarkedly lower kiln burning temperatures, than Type II portland cements.

It has also been found, quite surprisingly, that cement clinker produced in accordance with the invention is more readily grindable than is clinker as normally produced, i.e., without inclusion of the boron-containing component in the mix. Tests indicative of the grindability of the instant clinker as compared with clinker as normally produced were conducted in jar mills following procedures commonly accepted in the art, namely, by determining the Blaine surface area of the ground clinger at various stages of grinding. In specific terms, actual tests have shown that, by virtue o fthe improved grindability of clinker embodying this invention, production of the ground cement from such clinker can be increased approximately 140% to 200%.

For example, one cement made from clinker embodying this invention had a Blaine surface area of 3600 sq. cm. per gram after 4080 revolutions of a jar mill, whereas a comparable clinker as normally produced required 6120 revolutions to produce cement of substantially the same Blaine surface area (3590 sq. cm. per gram).

In another grindability test, the clinker of the D. Modified cement described above and a clinker corresponding thereto but produced without a boron-containing additive were ground. The latter clinker had the following analyzed composition:

| | Percent |
|---|---|
| $SiO_2$ | 23.52 |
| $Fe_2O_3$ | 3.72 |
| $Al_2O_3$ | 4.70 |
| CaO | 66.46 |
| Free Lime | 0.92 |
| "D. Control" | 99.32 |

3,000 grams of each clinker were ground with 3.5 cc. of Zeemill grinding aid, 6.0 cc. of water and 90 grams of gypsum for the D. Control and 71 grams of gypsum for the D. Modified. To achieve a Blaine surface area of about 4,000 sq. cm. per gram, a fineness to which pipe cement commonly is ground, the D. Modified clinker required about 10,700 revolutions of the mill whereas the D. Control clinker required about 22,900 revolutions.

These grinding data demonstrate the remarkably improved grindability of clinker made in accordance with this invention.

Although a wide choice of boron-containing components are available for use according to the invention, it is preferred to use boron trioxide ($B_2O_3$), raw colemanite or refined colemanite.

It will be apparent to persons skilled in the art that numerous changes can be made in the ingredients, conditions and proportions set forth in the foregoing illustrative embodiments without departing from the invention as described herein before and as defined in the appended claims.

We claim:
1. A method of making portland cement having a free lime content below about 2% by weight of said portland cement which comprises forming an admixture of pulverized lime-containing mineral, silicon oxide-containing mineral, aluminum oxide-containing mineral, iron oxide-containing mineral and an amount of a boron-containing substance sufficient to provide at least about 1% by weight of $B_2O_3$ in said admixture, heating said admixture at a temperature above about 2350° F. to fuse the components of said admixture into clinkers, and grinding said clinkers.

2. A method according to claim 1 wherein the amount of said boron-containing substance as $B_2O_3$ is in the range of about 1% to about 3%.

3. A method according to claim 1 wherein the amount of said boron-containing substance as $B_2O_3$ is in the range of about 1.5% to about 2.5%.

4. A method according to claim 1 wherein said boron-containing substance is an oxide of boron, a compound containing an oxide of boron or a compound that yields an oxide of boron at the temperatures prevailing in a cement kiln.

5. A method according to claim 1 wherein said boron-containing substance is boric oxide, calcium tetraborate or unrefined colemanite ore.

6. A method according to claim 1 wherein said boron-containing substance is boric oxide.

7. A method according to claim 1 wherein said boron-containing substance is unrefined colemanite ore.

8. A method according to claim 1 wherein said pulverized minerals are limestone, silica, alumina and iron oxide.

9. A method according to claim 1 wherein said admixture is heated at below about 2750° F. to form said clinkers.

10. A method for increasing the grindability of sintered portland cement clinkers formed in a kiln by fusion of the mineral components of said cement and/or increasing the compressive strength of said cement, which comprises forming an admixture of pulverized lime-containing mineral, silicon oxide-containing mineral, aluminum oxide-containing mineral, iron oxide-containing mineral and an amount of a boron-containing substance sufficient to provide at least about 1% by weight of $B_2O_3$ in said admixture, heating said admixture at a temperature above about 2350° F. to fuse the components of said admixture into clinkers, and grinding said clinkers.

11. A method for decreasing the operating temperature of a portland cement kiln and controlling the free lime content of portland cement clinkers at below about 2% by weight which comprises forming an admixture of pulverized lime-containing mineral, silicon oxide-containing mineral, aluminum oxide-containing mineral, iron oxide-containing mineral and an amount of a boron-containing substance sufficient to provide at least about 1% by weight of $B_2O_3$ in said admixture, and heating said admixture at a temperature in the range of from about 2350° F. to about 2550° F., to fuse the components thereof into clinkers.

References Cited

UNITED STATES PATENTS

| 2,709,661 | 5/1955 | Dietz | 106—100 |
| 2,684,913 | 7/1954 | West | 106—89 |
| 1,852,595 | 4/1932 | Steinour | 106—89 |

FOREIGN PATENTS

| 350,129 | 1931 | Great Britain | 106—100 |
| 284,294 | 1928 | Great Britain | 106—100 |

TOBIAS LEVOW, Primary Examiner

W. T. SCOTT, Assistant Examiner

U.S. Cl. X.R.

106—89, 102

UNITED STATES PATENT OFFICE
CERTIFICATE OF CORRECTION

Patent No. 3,682,669    Dated 8/8/72

Inventor(s) Thomas C. Slater et al.

It is certified that error appears in the above-identified patent and that said Letters Patent are hereby corrected as shown below:

Col. 1, l. 24, change "product" to -- products -- and l. 35, change "filed" to -- field --; Col. 2, l. 59, change "aluminm" to -- aluminum --; Col. 3, l. 8, change "$Al_2A_3$" to -- $Al_2O_3$ --, l. 9, change "noramlly" to -- normally --, l. 59, change "temperature" to -- temperatures -- and l. 67, before "ulexite" delete "and"; Col. 4, l. 10, change "Modifier" to -- Modified -- and l. 64, after "operation" insert a comma; Col. 5, l. 37, change "modified" to -- Modified -- and "control" to -- Control --; Col. 6, l. 33, change "day" to -- days -- and l. 41, change "finess" to -- fineness --; Col. 7, l. 19, change "remark-" to -- mark- --, l. 21, after "that" delete the comma, l. 30, change "clinger" to -- clinker-- and l. 32, change "o fthe" to -- of the --.

Signed and sealed this 9th day of January 1973.

(SEAL)
Attest:

EDWARD M. FLETCHER, JR.
Attesting Officer

ROBERT GOTTSCHALK
Commissioner of Patents